(12) United States Patent
Hu et al.

(10) Patent No.: US 12,357,971 B2
(45) Date of Patent: Jul. 15, 2025

(54) PREPARATION METHOD OF MONOMETALLIC OR BIMETALLIC NANOPARTICLE-SUPPORTED CATALYST

(71) Applicant: Chongqing Research Academy of Eco-Environmental Sciences, Chongqing (CN)

(72) Inventors: Wei Hu, Chongqing (CN); Yaoqiang Chen, Chongqing (CN); Rui Yuan, Chongqing (CN); Dan Zhang, Chongqing (CN)

(73) Assignee: Chongqing Research Academy of Eco-Environmental Sciences, Chongqing (CN)

( * ) Notice: Subject to any disclaimer, the term of this patent is extended or adjusted under 35 U.S.C. 154(b) by 333 days.

(21) Appl. No.: 17/951,419

(22) Filed: Sep. 23, 2022

(65) Prior Publication Data

US 2023/0100948 A1    Mar. 30, 2023

(30) Foreign Application Priority Data

Sep. 29, 2021  (CN) .......................... 202111149837.9

(51) Int. Cl.
  *B01J 21/04*   (2006.01)
  *B01J 21/06*   (2006.01)
  (Continued)

(52) U.S. Cl.
  CPC .............. *B01J 23/44* (2013.01); *B01J 23/02* (2013.01); *B01J 23/10* (2013.01); *B01J 35/23* (2024.01);
  (Continued)

(58) Field of Classification Search
  CPC ... B01J 21/04; B01J 23/02; B01J 23/10; B01J 23/42; B01J 23/44; B01J 23/464;
  (Continued)

(56) References Cited

U.S. PATENT DOCUMENTS

| | | | | |
|---|---|---|---|---|
| 4,714,693 A | * | 12/1987 | Targos | ................. B01J 37/0203 502/332 |
| 8,652,232 B2 | * | 2/2014 | Bisson | .................... B22F 1/056 585/273 |

(Continued)

*Primary Examiner* — Cam N. Nguyen
(74) *Attorney, Agent, or Firm* — Amster, Rothstein & Ebenstein LLP (57) ABSTRACT

A preparation method of a monometallic or bimetallic nanoparticle-supported catalyst is disclosed. The synthesis of metal nanoparticles with different shapes, sizes, and atomic structures is affected by nucleation and growth rates. By changing a ratio of strong and weak reducing agents, a suitable double reducing agent is provided for metal nanoparticles with different reduction potentials, where the strong reducing agent is used for rapid nucleation and the weak reducing agent is used for the growth of metal nanoparticles. Accordingly, modulation and control of the nucleation and growth rates can be realized during the synthesis of nanoparticles. In addition, through multiple actions of a combination of reducing agents with different reduction intensities, monometallic/bimetallic nanoparticles of different sizes, shapes, and atomic structures are controllably prepared, which are then supported with a carrier to obtain the monometallic or bimetallic nanoparticle-supported catalyst.

11 Claims, 6 Drawing Sheets

(51) Int. Cl.
*B01J 23/02* (2006.01)
*B01J 23/10* (2006.01)
*B01J 23/42* (2006.01)
*B01J 23/44* (2006.01)
*B01J 23/46* (2006.01)
*B01J 23/48* (2006.01)
*B01J 23/50* (2006.01)
*B01J 23/52* (2006.01)
*B01J 23/54* (2006.01)
*B01J 23/58* (2006.01)
*B01J 23/60* (2006.01)
*B01J 23/63* (2006.01)
*B01J 23/64* (2006.01)
*B01J 23/66* (2006.01)
*B01J 23/68* (2006.01)
*B01J 23/745* (2006.01)
*B01J 23/75* (2006.01)
*B01J 23/78* (2006.01)
*B01J 23/80* (2006.01)
*B01J 23/83* (2006.01)
*B01J 23/84* (2006.01)
*B01J 23/89* (2006.01)
*B01J 35/23* (2024.01)
*B01J 37/00* (2006.01)
*B01J 37/02* (2006.01)
*B01J 37/03* (2006.01)
*B01J 37/04* (2006.01)
*B01J 37/06* (2006.01)
*B01J 37/08* (2006.01)

(52) U.S. Cl.
CPC ......... *B01J 37/009* (2013.01); *B01J 37/0221* (2013.01); *B01J 37/038* (2013.01); *B01J 37/04* (2013.01); *B01J 37/06* (2013.01); *B01J 37/088* (2013.01)

(58) Field of Classification Search
CPC ... B01J 23/48; B01J 23/50; B01J 23/52; B01J 23/54; B01J 23/58; B01J 23/60; B01J 23/63; B01J 23/6482; B01J 23/66; B01J 23/682; B01J 23/745; B01J 23/75; B01J 23/78; B01J 23/80; B01J 23/83; B01J 23/8472; B01J 23/8906; B01J 23/8913; B01J 23/8933; B01J 23/894; B01J 23/8946; B01J 23/8953; B01J 23/898; B01J 35/23; B01J 37/009; B01J 37/0221; B01J 37/038; B01J 37/04; B01J 37/06; B01J 37/088
USPC .................................. 502/325–439
See application file for complete search history.

(56) References Cited

U.S. PATENT DOCUMENTS

| | | | |
|---|---|---|---|
| 9,040,449 B2* | 5/2015 | Semagina | B01J 37/0018 |
| | | | 502/332 |
| 9,056,310 B2* | 6/2015 | Rajaram | B01J 37/0207 |
| 9,233,356 B2* | 1/2016 | Nagao | B01J 23/464 |
| 9,358,527 B2* | 6/2016 | Nagata | B01J 35/50 |
| 9,550,170 B2* | 1/2017 | Wang | B01J 23/44 |
| 10,493,437 B2* | 12/2019 | Maclachlan | B01J 35/45 |
| 10,960,470 B2* | 3/2021 | Humphrey | B01J 35/50 |
| 11,273,494 B2* | 3/2022 | Humphrey | B01J 37/04 |
| 11,305,344 B2* | 4/2022 | Prabhakaran | C22C 5/02 |
| 11,826,833 B2* | 11/2023 | Humphrey | C22C 5/04 |
| 2015/0017570 A1* | 1/2015 | Yang | B22F 1/145 |
| | | | 429/523 |

* cited by examiner

FIG. 4D

PREPARATION METHOD OF MONOMETALLIC OR BIMETALLIC NANOPARTICLE-SUPPORTED CATALYST

CROSS REFERENCE TO RELATED APPLICATION

This patent application claims the benefit and priority of Chinese Patent Application No. 202111149837.9, filed with the China National Intellectual Property Administration on Sep. 29, 2021, the disclosure of which is incorporated by reference herein in its entirety as part of the present application.

TECHNICAL FIELD

The present disclosure relates to the technical field of supported metal catalysts, in particular to a preparation method of a monometallic or bimetallic nanoparticle-supported catalyst.

BACKGROUND

At present, a supported metal catalyst can be prepared by impregnation, precipitation, atomic deposition, and electrostatic adsorption. The technical route is that an active component precursor solution is supported on a carrier by means of impregnation, precipitation, and adsorption, so as to prepare the desired supported catalyst. Although the impregnation, precipitation, and electrostatic adsorption are simple, these approaches may easily lead to uncontrollable size and chemical state of metal nanoparticles which serve as the active component. Although metal nanocatalysts can be designed and prepared from an atomic scale by atomic deposition, it is difficult to obtain universal metal precursor solutions, and the preparation process is complicated and tedious. Currently, a combination of liquid-phase synthesis and supporting is the most desirable means for controlled preparation of monometallic/bimetallic nanoparticle-supported catalysts, and liquid-phase synthesis of the metal nanoparticles as an active component is also the bottleneck of this method. In recent years, researchers have mainly controlled the metal nucleation and growth by selecting suitable single reducing agents and surfactants/ligands/capping agents to regulate the size and chemical state of monometallic/bimetallic nanoparticles. However, different reducing agents cannot well control a relationship between the nucleation and growth of metal nanoparticles during the reduction of metal ions due to obvious differences in reduction potential. As a result, these reducing agents still have drawbacks in the controllable preparation of monometallic/bimetallic nanoparticles.

SUMMARY

An objective of the present disclosure is to provide a preparation method of a monometallic or bimetallic nanoparticle-supported catalyst. The preparation method can controllably prepare the monometallic or bimetallic nanoparticle-supported catalyst.

To achieve the above objective, the present disclosure provides the following technical solutions.

The preparation method provides a preparation method of a monometallic or bimetallic nanoparticle-supported catalyst, including the following steps:

mixing a capping agent solution, a metal precursor solution, and a double reducing agent for a reduction to obtain a metal nanoparticle suspension; where the metal precursor solution includes one or two metal elements selected from the group consisting of platinum, palladium, rhodium, iridium, cobalt, iron, titanium, vanadium, zinc, gold, silver, and a rare earth element; mixing the metal nanoparticle suspension with a carrier by a supporting method, or subjecting the metal nanoparticle suspension to centrifugation and washing sequentially by a double-solvent method, and dispersing in water; mixing an obtained suspension with a carrier suspension dispersed in n-hexane to conduct supporting; and roasting an obtained product to obtain the monometallic or bimetallic nanoparticle-supported catalyst; alternatively, when the supported catalyst is a bimetallic nanoparticle-supported catalyst, mixing a monometallic precursor solution, the capping agent solution, and the double reducing agent for a first reduction; mixing an obtained monometallic nanoparticle suspension with another metal precursor solution, the capping agent solution, and the double reducing agent for a second reduction to obtain a bimetallic nanoparticle suspension; mixing the bimetallic nanoparticle suspension with the carrier by the supporting method, or subjecting the bimetallic nanoparticle suspension to centrifugation and washing sequentially by the double-solvent method, and dispersing in water; mixing an obtained suspension with the carrier suspension dispersed in n-hexane to conduct supporting; and roasting an obtained product to obtain the bimetallic nanoparticle-supported catalyst; alternatively, when the supported catalyst is a bimetallic nanoparticle-supported catalyst, mixing the monometallic precursor solution, the capping agent solution, and the double reducing agent for a first reduction; mixing the obtained monometallic nanoparticle suspension with the carrier; mixing an obtained composite suspension with the another metal precursor solution, the capping agent solution, and the double reducing agent for a second reduction; and subjecting an obtained product to calcination to obtain the bimetallic nanoparticle-supported catalyst; where a metal element in the monometallic precursor solution is selected from the group consisting of platinum, palladium, rhodium, iridium, cobalt, iron, titanium, vanadium, zinc, gold, silver, and a rare earth element; a metal element in the another metal precursor solution is selected from the group consisting of platinum, palladium, rhodium, iridium, cobalt, iron, titanium, vanadium, zinc, gold, silver, and a rare earth element; and the metal element in the monometallic precursor solution is different from the metal element in the another metal precursor solution; and the double reducing agent includes a strong reducing agent and a weak reducing agent; the strong reducing agent is selected from the group consisting of sodium borohydride, oxalic acid, and hydrogen; and the weak reducing agent is one or more selected from the group consisting of ethanol, formaldehyde, ethylene glycol, glucose, and tartaric acid.

Preferably, a capping agent in the capping agent solution is selected from the group consisting of polyvinylpyrrolidone, cetyltrimethylammonium bromide, and an oleylamine-dibenzyl ether mixture; and in the oleylamine-dibenzyl ether mixture, oleylamine and dibenzyl ether have a volume ratio of (1-5):1.

Preferably, the capping agent and the metal element in the metal precursor solution have a mass ratio of (5-80):1.

Preferably, the strong reducing agent and the weak reducing agent have a molar ratio of (0.001-0.1):1.

Preferably, the double reducing agent and the metal element in the metal precursor solution have a molar ratio of (1-10):1.

Preferably, a total mass of the metal element in the metal precursor solution accounts for 0.5% to 2.0% of that of the supported catalyst.

Preferably, the reduction, the first reduction, and the second reduction each are conducted at 100° C. for 3 h to 12 h.

Preferably, the carrier is selected from the group consisting of γ-$Al_2O_3$, rare earth element-modified $Al_2O_3$, and alkaline earth element-modified $Al_2O_3$.

Preferably, the roasting is conducted at 350° C. to 550° C. for 3 h to 12 h.

Preferably, the roasting is conducted in an oxygen atmosphere or a nitrogen atmosphere.

The present disclosure provides a preparation method of a monometallic or bimetallic nanoparticle-supported catalyst. The synthesis of metal nanoparticles with different shapes, sizes, and atomic structures is affected by nucleation and growth rates. In the present disclosure, reducing agent combinations are selected based on the reduction potential of different metals; by changing a ratio of strong and weak reducing agents, a suitable double reducing agent is provided for metal nanoparticles with different reduction potentials, where the strong reducing agent is used for rapid nucleation and the weak reducing agent is used for the growth of metal nanoparticles. Accordingly, modulation and control of the nucleation and growth rates can be realized during the synthesis of nanoparticles. In addition, through multiple actions of a combination of reducing agents with different reduction intensities, monometallic/bimetallic nanoparticles of different sizes, shapes, and atomic structures are controllably prepared, which are then supported with a carrier to obtain the monometallic or bimetallic nanoparticle-supported catalyst. The present disclosure provides a flexible, simple, highly-universal, and repeatable liquid-phase and double-reduction method for controllably preparing metal nanoparticle active components of the supported metal catalyst.

DETAILED DESCRIPTION OF THE EMBODIMENTS

The preparation method provides a preparation method of a monometallic or bimetallic nanoparticle-supported catalyst, including the following steps:

mixing a capping agent solution, a metal precursor solution, and a double reducing agent for a reduction to obtain a metal nanoparticle suspension; where the metal precursor solution includes one or two metal elements selected from the group consisting of platinum, palladium, rhodium, iridium, cobalt, iron, titanium, vanadium, zinc, gold, silver, and a rare earth element; mixing the metal nanoparticle suspension with a carrier by a supporting method, or subjecting the metal nanoparticle suspension to centrifugation and washing sequentially by a double-solvent method, and dispersing in water; mixing an obtained suspension with a carrier suspension dispersed in n-hexane to conduct supporting; and roasting an obtained product to obtain the monometallic or bimetallic nanoparticle-supported catalyst; alternatively, when the supported catalyst is a bimetallic nanoparticle-supported catalyst, mixing a monometallic precursor solution, the capping agent solution, and the double reducing agent for a first reduction; mixing an obtained monometallic nanoparticle suspension with another metal precursor solution, the capping agent solution, and the double reducing agent for a second reduction to obtain a bimetallic nanoparticle suspension; mixing the bimetallic nanoparticle suspension with the carrier by the supporting method, or subjecting the bimetallic nanoparticle suspension to centrifugation and washing sequentially by the double-solvent method, and dispersing in water; mixing an obtained suspension with the carrier suspension dispersed in n-hexane to conduct supporting; and roasting an obtained product to obtain the bimetallic nanoparticle-supported catalyst; alternatively, when the supported catalyst is a bimetallic nanoparticle-supported catalyst, mixing the monometallic precursor solution, the capping agent solution, and the double reducing agent for a first reduction; mixing the obtained monometallic nanoparticle suspension with the carrier; mixing an obtained composite suspension with the another metal precursor solution, the capping agent solution, and the double reducing agent for a second reduction; and subjecting an obtained product to calcination to obtain the bimetallic nanoparticle-supported catalyst; where a metal element in the monometallic precursor solution is selected from the group consisting of platinum, palladium, rhodium, iridium, cobalt, iron, titanium, vanadium, zinc, gold, silver, and a rare earth element; a metal element in the another metal precursor solution is selected from the group consisting of platinum, palladium, rhodium, iridium, cobalt, iron, titanium, vanadium, zinc, gold, silver, and a rare earth element; and the metal element in the monometallic precursor solution is different from the metal element in the another metal precursor solution; and the double reducing agent includes a strong reducing agent and a weak reducing agent; the strong reducing agent is selected from the group consisting of sodium borohydride, oxalic acid, and hydrogen; and the weak reducing agent is one or more selected from the group consisting of ethanol, formaldehyde, ethylene glycol, glucose, and tartaric acid.

In the present disclosure, unless otherwise specified, all raw materials required for preparation are commercially available products well known to persons skilled in the art.

(Method 1) In the present disclosure, the capping agent solution, the metal precursor solution, and the double reducing agent are mixed for a reduction to obtain the metal nanoparticle suspension. A capping agent in the capping agent solution is preferably selected from the group consisting of polyvinylpyrrolidone, cetyltrimethylammonium bromide, and an oleylamine-dibenzyl ether mixture; and in the oleylamine-dibenzyl ether mixture, oleylamine and dibenzyl ether have a volume ratio of preferably (1-5):1. A solvent used in the capping agent solution is preferably acetonitrile or deionized water; and the capping agent and the solvent have a mass ratio of preferably (15-30):1, more preferably 15:1. There is no special limitation on a preparation process of the capping agent solution, and the solution can be prepared according to a process well known in the art; in an example, a polyvinylpyrrolidone (PVP-K30) powder is dissolved in the deionized water by ultrasonic vibration for 1 h to form a PVP solution.

In the present disclosure, the metal precursor solution preferably includes one or two metal elements selected from the group consisting of platinum, palladium, rhodium, iridium, cobalt, iron, titanium, vanadium, zinc, gold, silver, and a rare earth element; when there are two types of the metal elements in the metal precursor solution, there is no special limitation on a ratio of the two types of the metal elements, which can be adjusted according to actual needs. The rare earth element is preferably selected from the group consisting of cerium, yttrium, and lanthanum; the capping agent and the metal elements in the metal precursor solution have a mass ratio of preferably (5-80):1, more preferably (20-60):1; and a metal precursor in the metal precursor solution is preferably a metal nitrate corresponding to a metal element. A solvent used in the metal precursor solution is preferably water; there is no special limitation on a concentration and a preparation process of the metal precursor solution, as long as the above mass ratio can be satisfied according to a process well known in the art.

In the present disclosure, the double reducing agent includes preferably a strong reducing agent and a weak reducing agent; the strong reducing agent is preferably selected from the group consisting of sodium borohydride, oxalic acid, and hydrogen; and the weak reducing agent is preferably one or more selected from the group consisting of ethanol, formaldehyde, ethylene glycol, glucose, and tartaric acid.

In the present disclosure, a composition of the double reducing agent is preferably determined according to types of the metal elements in the monometallic or bimetallic nanoparticle-supported catalyst to be prepared; there is no special limitation on a process of selecting the double reducing agent, and double reducing agents that can reduce the desired monometallic or bimetallic nanoparticle-supported catalyst can be selected according to theoretical knowledge in the art.

In the present disclosure, a monometallic element in the monometallic nanoparticle-supported catalyst is preferably selected from the group consisting of platinum, platinum, palladium, rhodium, iridium, cobalt, and gold; a bimetallic element in the bimetallic nanoparticle-supported catalyst is preferably two selected from the group consisting of platinum, palladium, rhodium, iridium, and cobalt; alternatively, the bimetallic element preferably includes a first metal and a second metal; the first metal is preferably selected from the group consisting of platinum, palladium, rhodium, iridium, and cobalt; and the second metal is preferably selected from the group consisting of iron, titanium, vanadium, zinc, gold, and silver; alternatively, the bimetallic element preferably includes the first metal and a rare earth element; the double reducing agent is preferably selected from the group consisting of sodium borohydride+formaldehyde, sodium borohydride+ethylene glycol, oxalic acid+ethanol, oxalic acid+formaldehyde, oxalic acid+ethylene glycol, oxalic acid+tartaric acid, hydrogen+formaldehyde, hydrogen+ethylene glycol, hydrogen+glucose, and hydrogen+tartaric acid.

In the present disclosure, the strong reducing agent and the weak reducing agent have a molar ratio of preferably (0.001-0.1):1, more preferably 0.001:1; and the double reducing agent and the metal elements in the metal precursor solution have a molar ratio of preferably (1-10):1, more preferably 10:1.

In the present disclosure, a process for mixing the capping agent solution, the metal precursor solution, and the double reducing agent preferably includes: mixing the capping agent solution and the metal precursor solution, and conducting ultrasonic vibration for 1 h; adding acetonitrile or water to an obtained mixed solution, and stirring with ultrasonic vibration for 1 h; adding the double reducing agent into a resulting dilution. The mixed solution of the capping agent solution and the metal precursor solution and the acetonitrile (or water) have a volume ratio of preferably (10-20):1; a method for adding the double reducing agent includes preferably adding the strong reducing agent and the weak reducing agent simultaneously, or adding the strong reducing agent, and then adding the weak reducing agent. There is no special limitation on ultrasonic vibration and stirring processes, which can be performed according to well-known processes in the art.

In the present disclosure, the reduction is conducted at preferably 100° C. for preferably 3 h to 12 h, more preferably 5 h to 8 h under preferably reflux conditions. During the reduction, the metal precursor in the metal precursor solution is reduced to a metal element under an action of the double reducing agent.

In the present disclosure, after the reduction is completed, an obtained product system is preferably cooled to room temperature to obtain a metal nanoparticle suspension; alternatively, the product system is cooled to room temperature, followed by conducting centrifugation (12,000 rpm to 15,000 rpm) and washing, and an obtained material is diluted with a same volume of the acetonitrile as the product system to obtain the metal nanoparticle suspension; and the metal nanoparticles are monometallic or bimetallic nanoparticles.

In the present disclosure, an obtained metal nanoparticle suspension is subjected to the supporting method, including: mixing the metal nanoparticle suspension with a carrier by a supporting method, or subjecting the metal nanoparticle suspension to centrifugation and washing sequentially by a double-solvent method, and dispersing in water; mixing an obtained suspension with a carrier suspension dispersed in n-hexane to conduct supporting; and roasting an obtained product to obtain the monometallic or bimetallic nanoparticle-supported catalyst. There is no special limitation on a process for mixing the metal nanoparticle suspension and the carrier, and the materials may be uniformly mixed according to a process well known in the art.

In the present disclosure, the metal nanoparticle suspension is centrifuged and washed successively, and then dispersed in water; there is no special limitation on a process for mixing the suspension with the n-hexane-dispersed carrier suspension, which can be conducted according to a well-known process in the art.

In the present disclosure, the carrier is preferably selected from the group consisting of $\gamma$-$Al_2O_3$, rare earth element-modified $Al_2O_3$, and alkaline earth element-modified $Al_2O_3$; a preparation process of the rare earth element-modified $Al_2O_3$ or the alkaline earth element-modified $Al_2O_3$ preferably includes: mixing an $Al(NO_3)_3 \cdot 9H_2O$ aluminum nitrate solution at a concentration of 10 wt % with a double-alkali buffer solution containing ammonia water+ammonium carbonate (the ammonia water and the ammonium carbonate have a molar ratio of preferably 3:3) for co-precipitation, while maintaining a pH value at 8.8; aging an obtained precipitate at 100° C. for 6 h to 12 h; subjecting an obtained material to filtration and washing repeatedly until an obtained filtrate tends to be neutral; drying the obtained material at 120° C. for 12 h to 24 h, and subjecting an obtained powder sample to calcination at 600° C. to 950° C. for 3 h to 6 h to obtain the γ-$Al_2O_3$; impregnating a rare earth element precursor aqueous solution (or an alkaline earth metal precursor aqueous solution) into the γ-$Al_2O_3$ (an amount of rare earth element impregnation is 5 wt. % to 15 wt. %) by an iso-water pore volume impregnation method, and drying for 12 h to 24 h; roasting the γ-$Al_2O_3$ and impregnated γ-$Al_2O_3$ in a muffle furnace at 600° C. to 950° C. for 3 h to obtain the γ-$Al_2O_3$, the rare earth element-modified $Al_2O_3$, or the alkaline earth element modified $Al_2O_3$, respectively. There is no special limitation on a specific type of the rare earth element and the alkaline earth metal and precursors thereof, and rare earth elements or alkaline earth metals well known in the art may be sufficient.

In the present disclosure, a total mass of the metal elements in the metal precursor solution accounts for preferably 0.5% to 2.0%, more preferably 1.5% of that of the supported catalyst; an amount of the carrier preferably satisfies the above ratio.

In the present disclosure, the supporting is conducted preferably under stirring at preferably room temperature for preferably 12 h.

In the present disclosure, after the supporting is completed, an obtained suspension is preferably subjected to centrifugation, washing, and drying in sequence to obtain a powder material; the centrifugation is conducted at preferably 8,000 rpm to 12,000 rpm; the drying is conducted at preferably 100° C. for preferably 12 h; and there is no special limitation on a washing process, which can be conducted according to a process well known in the art.

In the present disclosure, the powder material is preferably subjected to roasting to obtain the monometallic or bimetallic nanoparticle-supported catalyst; and the roasting is conducted preferably in an oxygen atmosphere or a nitrogen atmosphere at preferably 550° C. for preferably 3 h. The monometallic or bimetallic nanoparticle-supported catalyst in the form of a metal oxide is obtained by the roasting.

As another solution of the present disclosure (denoted as Method 2), the method includes: when the supported catalyst is a bimetallic nanoparticle-supported catalyst, mixing a monometallic precursor solution, the capping agent solution, and the double reducing agent for a first reduction; mixing an obtained monometallic nanoparticle suspension with another metal precursor solution, the capping agent solution, and the double reducing agent for a second reduction to obtain a bimetallic nanoparticle suspension; mixing the bimetallic nanoparticle suspension with the carrier to conduct supporting; and roasting an obtained product to obtain the bimetallic nanoparticle-supported catalyst.

In the present disclosure, the monometallic precursor solution, the capping agent solution, and the double reducing agent are mixed for the first reduction; the resulting product is mixed with the another metal precursor solution, the capping agent solution, and the double reducing agent for the second reduction to obtain the bimetallic nanoparticle suspension. The metal elements in the monometallic precursor solution is preferably selected from the group consisting of platinum, palladium, rhodium, iridium, cobalt, iron, titanium, vanadium, zinc, gold, silver, and a rare earth element.

In the present disclosure, a solvent used in the monometallic precursor solution is preferably the same as the metal precursor in Method 1, and there is no special limitation on a concentration of the monometallic precursor solution, as long as the above molar ratio is satisfied; and the capping agent solution and the double reducing agent are preferably the same as those in Method 1, which are not repeated here.

In the present disclosure, a process for mixing the monometallic precursor solution, the capping agent solution, and the double reducing agent preferably includes: mixing the capping agent solution and the monometallic precursor solution, diluting with acetonitrile or water, and adding the double reducing agent to a resulting dilution. The mixed solution of the capping agent solution and the monometallic precursor solution and the acetonitrile (or water) have a volume ratio of preferably 1:(10-20); a method for adding the double reducing agent is preferably the same as that of Method 1, which is not repeated here.

In the present disclosure, the first reduction is preferably the same as that in Method 1, which is not repeated here.

In the present disclosure, after the first reduction is completed, an obtained product is preferably cooled to room temperature, followed by conducting centrifugation and washing in sequence, and water is added to an obtained material to obtain the monometallic nanoparticle suspension. The centrifugation is conducted at preferably 15,000 rpm, and the washings is conducted preferably 3 times. There is no special limitation on a concentration of the monometallic nanoparticle suspension, as long as a catalyst with the corresponding metal loading can be obtained.

In the present disclosure, the monometallic nanoparticle suspension is mixed with the another metal precursor solution, the capping agent solution, and the double reducing agent for the second reduction to obtain the bimetallic nanoparticle suspension. The metal element in the another metal precursor solution is preferably selected from the group consisting of platinum, palladium, rhodium, iridium, cobalt, iron, titanium, vanadium, zinc, gold, silver, and a rare earth element; and the metal elements in the monometallic precursor solution are preferably different from those in the another metal precursor solution.

In the present disclosure, a total mass of the metal elements in the monometallic precursor solution and a metal elements in another metal precursor solution and a mass of the capping agent have a ratio of preferably 1:(5-80), more preferably 1:(20-60); a total mole of the double reducing agent and a total mole of the metal elements in the monometallic precursor solution and the metal elements in the another metal precursor solution have a molar ratio of preferably (1-10):1, more preferably 10:1.

In the present disclosure, there is no special limitation on a process for the mixing, which can be conducted according to a process well known in the art; and conditions of the second reduction are preferably the same as those of the reduction in Method 1, which are not repeated here.

In the present disclosure, after the second reduction is completed, an obtained product is preferably cooled to room temperature, followed by centrifugation and washing to obtain the bimetallic nanoparticle suspension; a process of the centrifugation and washing is preferably the same as the process after the first reduction.

In the present disclosure, an obtained bimetallic nanoparticle suspension is subjected to the supporting method, including: mixing the bimetallic nanoparticle suspension with a carrier by a supporting method, or subjecting the bimetallic nanoparticle suspension to centrifugation and washing sequentially by a double-solvent method, and dispersing in water; mixing an obtained suspension with a carrier suspension dispersed in n-hexane to conduct supporting; and roasting an obtained product to obtain the bimetallic nanoparticle-supported catalyst. In the present disclosure, a total mass of the metal elements in the monometallic precursor solution and the metal salt elements in the another metal precursor solution accounts for preferably 0.5% to 2.0%, more preferably 1.5% of that of the supported catalyst; an amount of the carrier preferably satisfies the above ratio. The supporting and the roasting are preferably the same as those of Method 1, which are not repeated here. There is no special limitation on a process of the double-solvent method, which can be conducted according to the well-known process.

As another solution of the present disclosure (denoted as Method 3), the method includes: when the supported catalyst is a bimetallic nanoparticle-supported catalyst, mixing the monometallic precursor solution, the capping agent solution, and the double reducing agent for a first reduction; mixing the obtained monometallic nanoparticle suspension with the carrier; mixing an obtained composite suspension with the another metal precursor solution, the capping agent solution, and the double reducing agent for a second reduction; and subjecting an obtained product to calcination to obtain the bimetallic nanoparticle-supported catalyst.

In the present disclosure, the capping agent solution, the monometallic precursor solution, and the double reducing agent are mixed for a first reduction to obtain the monometallic nanoparticle suspension. A process for mixing the capping agent solution, the monometallic precursor solution, and the double reducing agent to conduct the first reduction, and a type and ratio of the raw materials are the same as those in the process of mixing the capping agent solution, the monometallic precursor solution, and the double reducing agent to conduct the first reduction in Method 2, which are not repeated here.

In the present disclosure, the monometallic nanoparticle suspension is mixed with the carrier; an obtained composite suspension is mixed with the another metal precursor solution, the capping agent solution, and the double reducing agent for a second reduction; and an obtained product is roasted to obtain a bimetallic nanoparticle-supported catalyst.

In the present disclosure, preferably, the carrier is added to the monometallic nanoparticle suspension, and stirred for 12 h; an obtained suspension is subjected to centrifugation, washing and drying (100° C. for 12 h) successively; an obtained powder material was added to acetonitrile or water, and stirred for 3 h to form a suspension; the suspension is mixed with the another metal precursor solution and the capping agent solution, and subjected to ultrasonic vibration for 1 h; and an obtained product is added with the double reducing agent, and then mixed well by stirring. A process of the centrifugation, washing and drying is preferably the same as the process after the supporting in Method 1, which are not repeated here. There is no special limitation on a consumption of the acetonitrile or water, which can be adjusted according to actual needs. There is no special limitation on a process of the stirring and ultrasonic vibration, which can be conducted according to well-known processes in the art.

In the present disclosure, a total mass of the metal elements in the monometallic precursor solution and the metal salt elements in the another metal precursor solution accounts for preferably 0.5% to 2.0%, more preferably 1.5% of that of the supported catalyst; an amount of the carrier preferably satisfies the above ratio.

In the present disclosure, the types and ratios of the other metal precursor solution, the capping agent solution, and the double reducing agent, as well as the second reduction are preferably the same as those in Method 2, which are not repeated here.

In the present disclosure, after the second reduction is completed, an obtained product is preferably cooled to room temperature, followed by conducting centrifugation, washing, and drying in sequence, and then roasted to obtain a bimetallic nanoparticle-supported catalyst; and processes of the centrifugation, washing, and drying are preferably the same as the processes after supporting in Method 1, which are not repeated here.

The roasting is preferably the same as that of Method 1, which is not repeated here.

Figure 1:
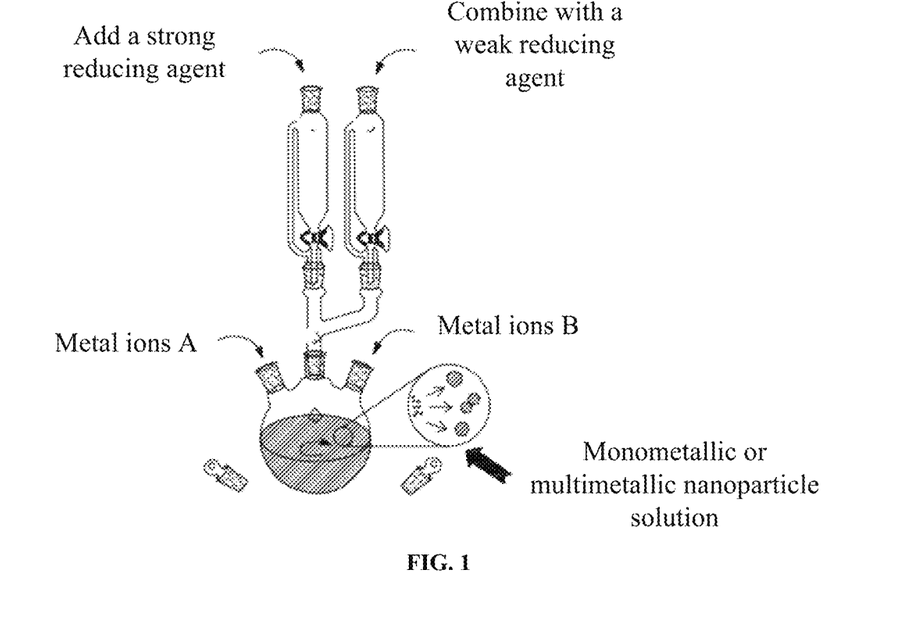
FIG. 1 shows a flow chart of preparing monometallic or bimetallic nanoparticles according to a preparation process of a monometallic or bimetallic nanoparticle-supported catalyst of the present disclosure.

FIG. 1 shows a flow chart of preparing monometallic or bimetallic nanoparticles according to a preparation process of a monometallic or bimetallic nanoparticle-supported catalyst of the present disclosure. As shown in FIG. 1, in the present disclosure, a combination of the strong reducing agent and the weak reducing agent is added to the monometallic or bimetallic precursor solution, to obtain the monometallic or bimetallic nanoparticles.

Figure 2:
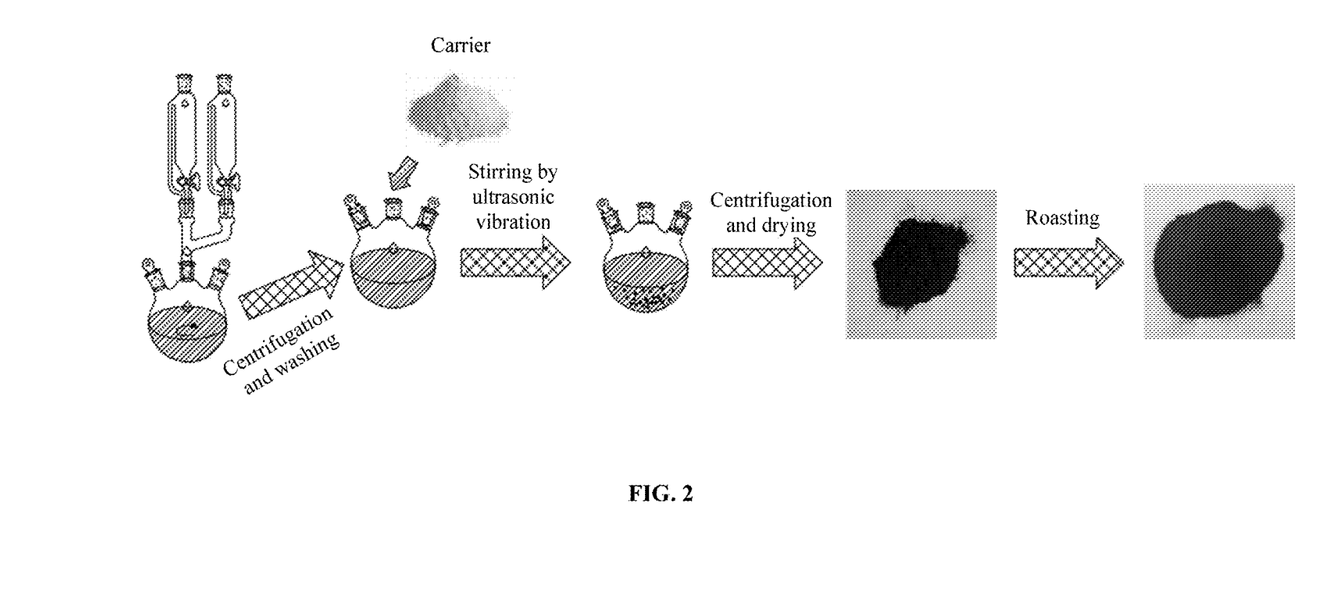
FIG. 2 shows a flow chart of supporting the monometallic or bimetallic nanoparticles with a carrier and post-treatment to prepare the monometallic or bimetallic nanoparticle-supported catalyst according to the preparation process of the monometallic or bimetallic nanoparticle-supported catalyst of the present disclosure.
Figure 3A:
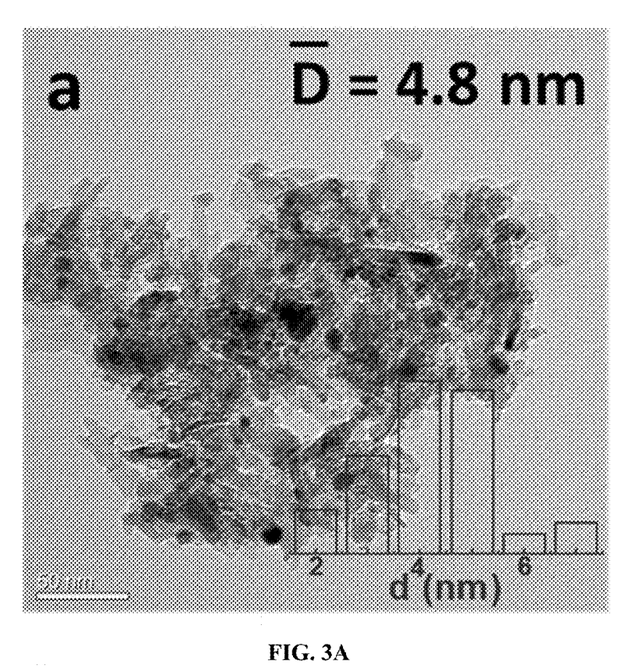
FIG. 3A to FIG. 3D show transmission electron microscopy (TEM) images of Pd metal-supported catalysts prepared by different ratios of double reducing agents in Example 1 and Examples 5 to 7 of the present disclosure.
Figure 3B:
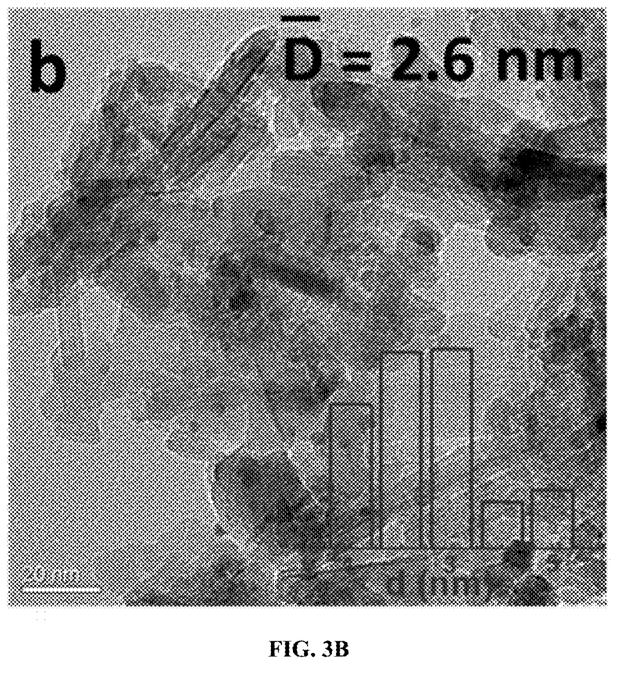
Figure 3C:
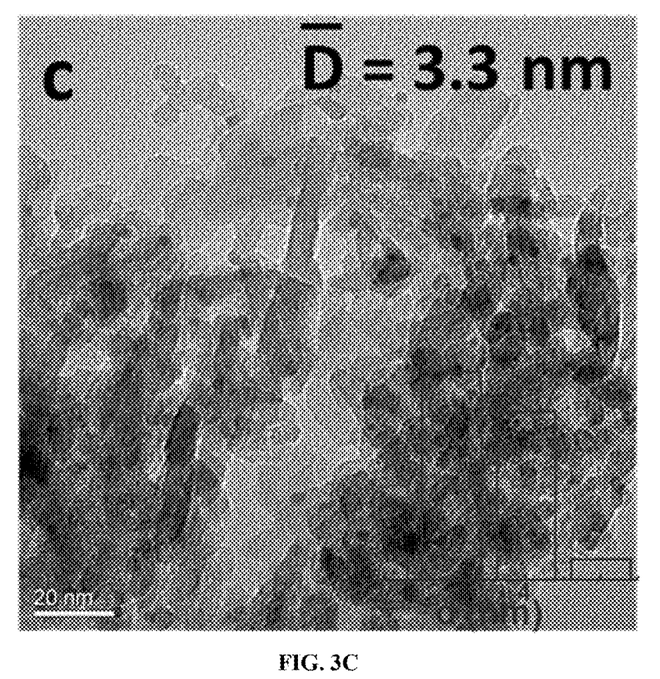
Figure 3D:
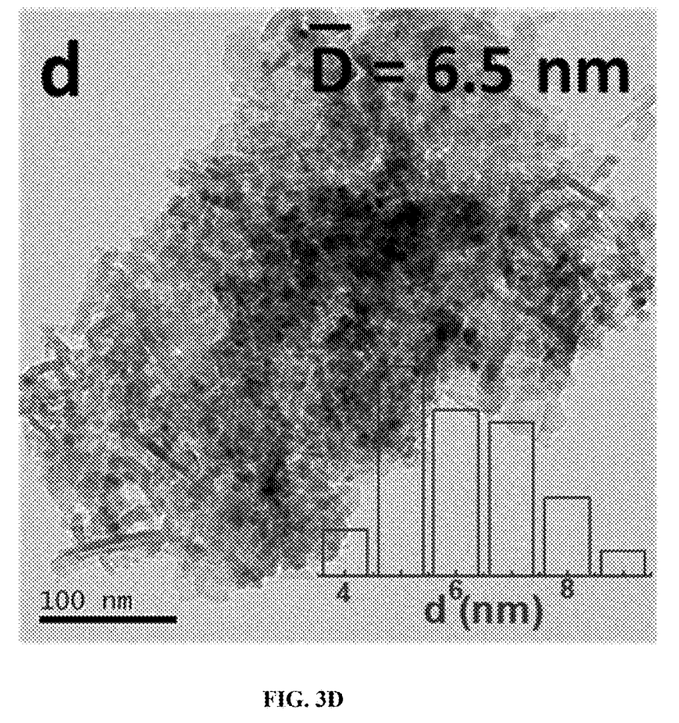
Figure 4A:
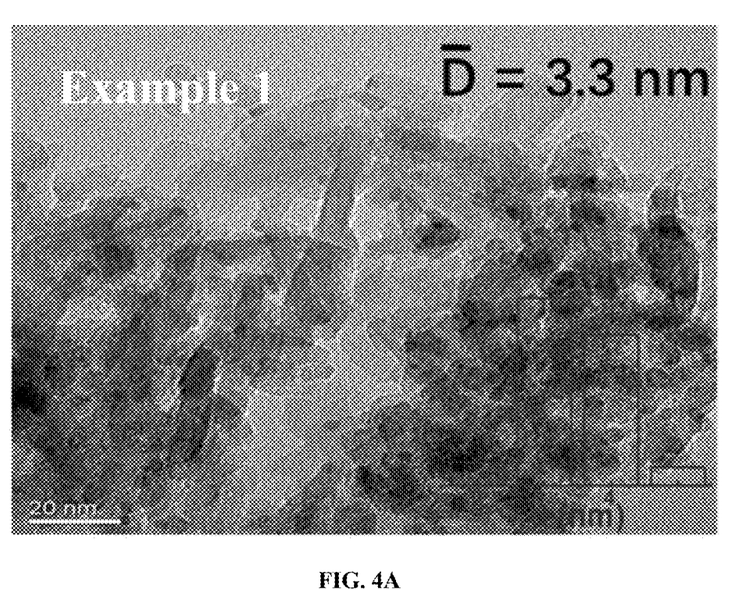
FIG. 4A to FIG. 4D show TEM/high-resolution transmission electron microscopy (HRTEM) and high-angle annular dark-field scanning transmission electron microscopy (HAADF-STEM) images of the Pd metal-supported catalysts and Pd-Pt bimetallic supported catalysts prepared in Examples 1 to 4.
Figure 4B:
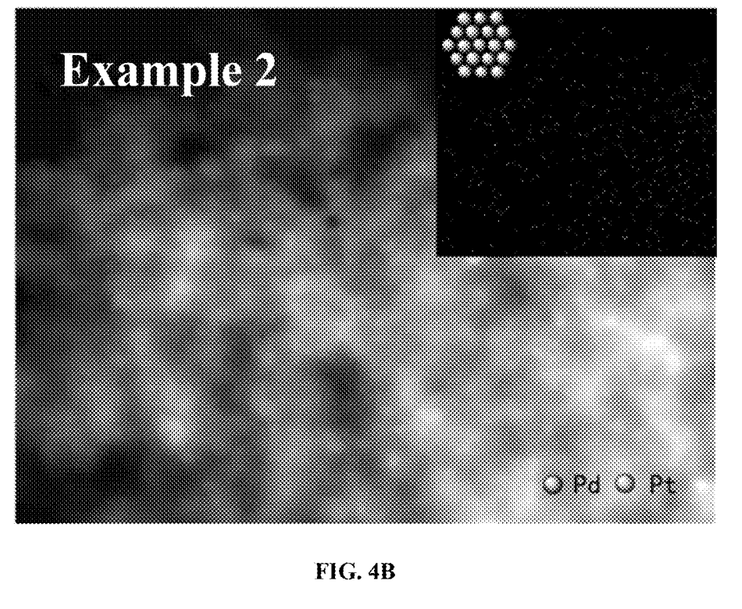
Figure 4C:
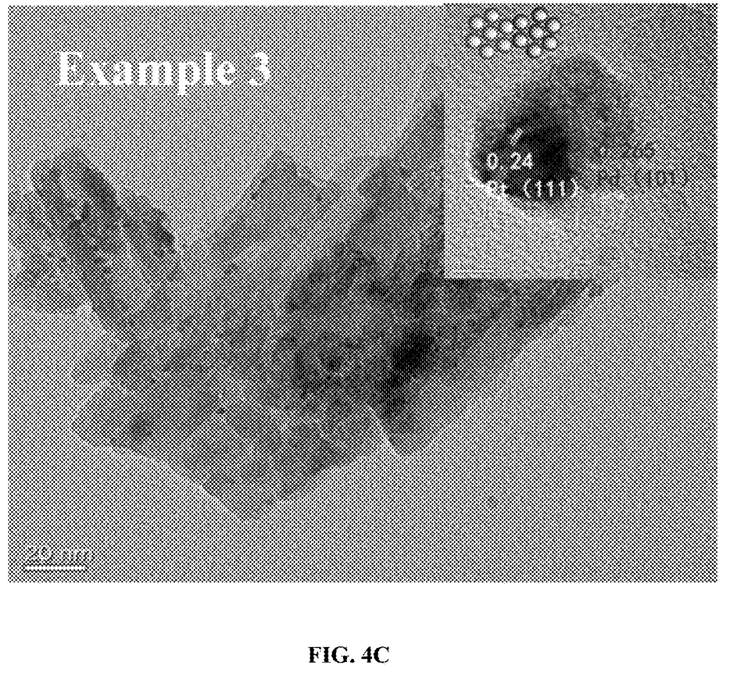
Figure 4D:
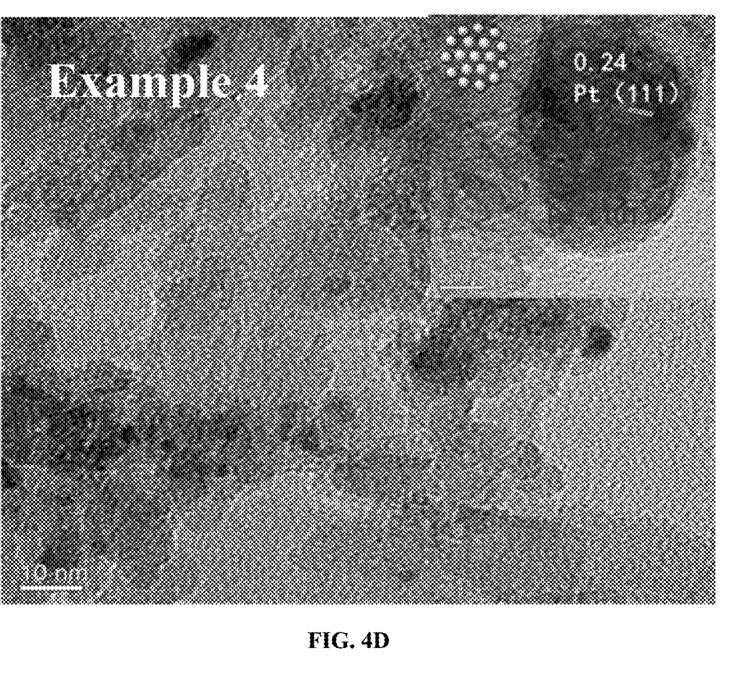

FIG. 2 shows a flow chart of supporting the monometallic or bimetallic nanoparticles with a carrier and post-treatment to prepare the monometallic or bimetallic nanoparticle-supported catalyst according to the preparation process of the monometallic or bimetallic nanoparticle-supported catalyst of the present disclosure. As shown in FIG. 2, in the present disclosure, a monometallic or bimetallic nanoparticle solution is centrifuged and washed successively; a metal nanoparticle suspension is mixed with the carrier by the supporting method, and a resulting mixture is mixed well by ultrasonic stirring to conduct supporting; and an obtained material is centrifuged, dried and roasted to obtain the monometallic or bimetallic nanoparticle-supported catalyst.

The technical solutions of the present disclosure will be described below clearly and completely in conjunction with the examples of the present disclosure. Apparently, the described examples are only a part of, not all of, the examples of the present disclosure. All other embodiments obtained by those of ordinary skill in the art based on the embodiments of the present disclosure without creative efforts shall fall within the protection scope of the present disclosure.

EXAMPLE 1

In this example, with La-modified $Al_2O_3$ (La—$Al_2O_3$) prepared by co-precipitation+incipient wetness impregnation method as a carrier, an $Al(NO_3)_3 \cdot 9H_2O$ aqueous solution with a concentration of 10 wt % was added into a double-alkali buffer solution containing ammonia water+ammonium carbonate (at a molar ratio of 3:3) to maintain a pH value at 8.8 for co-precipitation; an obtained precipitate was aged at 100° C. for 12 h; an obtained material was filtered and washed repeatedly until an obtained filtrate tended to be neutral; a resulting material was dried at 120° C. for 24 h; an obtained powder sample was calcined at 950° C. for 3 h to obtain $\gamma$-$Al_2O_3$; a $La(NO_3)_3$ aqueous solution was impregnated into the $\gamma$-$Al_2O_3$ (an impregnation amount of the rare earth element was 5 wt. %) by an iso-water pore volume impregnation method, and dried for 24 h; and the $\gamma$-$Al_2O_3$ and the impregnated $\gamma$-$Al_2O_3$ were roasted in a muffle furnace at 950° C. for 3 h to obtain the La-modified $Al_2O_3$.

A monometallic nanocatalyst was prepared by a supporting method, and a content of a single metal (Pd) accounted for 1.5 wt % of a total mass of the monometallic nanocatalyst; monometallic nanoparticles were prepared by a double-reduction method, including the following steps:

1) according to a prefabricated catalyst amount and the content of a monometallic active component (1.5 wt %), a polyvinylpyrrolidone (PVP-K30) powder was dissolved in deionized water by ultrasonic vibration for 1 h to form a PVP solution, where the PVP and the deionized water had a mass ratio of 15:1; under continuous stirring, 0.018 g of a $Pd(NO_3)_2$ precursor solution (with a Pd content of 15 wt %) was added dropwise to the PVP solution, followed by conducting ultrasonic vibration for 1 h, where the PVP and the metal Pd element had a mass ratio of 20:1; deionized water was added to an obtained mixed solution, and stirred with ultrasonic vibration for 1 h to obtain a $Pd^{2+}$-PVP dilution, where the deionized water and the mixed solution had a volume ratio of 20:1;

2) a double reducing agent included a strong reducing agent (sodium borohydride)+a weak reducing agent (tartaric acid) (the sodium borohydride and the tartaric acid had a molar weight ratio of 0.001:1); the double reducing agent was added to the $Pd^{2+}$-PVP dilution according to the Pd metal and the reducing agent at a molar weight ratio of 10:1, where the sodium borohydride and the tartaric acid were added in sequence, and stirred and mixed evenly; an obtained mixed solution was condensed and refluxed at 100° C. for 3 h, and cooled to room temperature (25° C.) to obtain a Pd metal nanoparticle suspension; and 3) the carrier $La—Al_2O_3$ was added to the Pd metal nanoparticle suspension and stirred continuously for 12 h; an obtained suspension was centrifuged (at 12,000 rpm), washed, and dried at 100° C. for 12 h successively; an obtained powder sample was heated to 550° C. for 3 h in an oxygen atmosphere for oxidization to obtain a $Pd/La—Al_2O_3$ catalyst.

EXAMPLE 2

In this example, with MgO-surface-modified $Al_2O_3$ ($MgO—Al_2O_3$) prepared by co-precipitation+incipient wetness impregnation method as a carrier, an $Al(NO_3)_3·9H_2O$ aqueous solution with a concentration of 10 wt % was added into a double-alkali buffer solution containing ammonia water+ammonium carbonate (at a molar ratio of 3:3) to maintain a pH value at 8.8 for co-precipitation; an obtained precipitate was aged at 100° C. for 12 h; an obtained material was filtered and washed repeatedly until an obtained filtrate tended to be neutral; a resulting material was dried at 120° C. for 24 h; an obtained powder sample was calcined at 950° C. for 3 h to obtain $\gamma$-$Al_2O_3$; a $Mg(NO_3)_2·6H_2O$ precursor aqueous solution was impregnated into the $\gamma$-$Al_2O_3$ (an impregnation amount of the MgO was 5 wt. %) by an iso-water pore volume impregnation method, and dried for 24 h; and the $\gamma$-$Al_2O_3$ and the impregnated $\gamma$-$Al_2O_3$ were roasted in a muffle furnace at 950° C. for 3 h to obtain the MgO-modified $Al_2O_3$.

A bimetallic nanocatalyst was prepared by a supporting method, and a total content of a bimetal (Pd and Pt) accounted for 1.5 wt % of a total mass of the catalyst; bimetallic nanoparticles were prepared by a double-reduction method, including the following steps:

1) according to a prefabricated catalyst amount and the content of a bimetallic active component (1.5 wt %), a $Pd(NO_3)_2$ solution (with a Pd content of 15 wt %) and a $Pt(NO_3)_2$ solution (with a Pt content of 18 wt %) were mixed to obtain a metal precursor mixed solution, where Pd to Pt had a mass ratio of 4:1; a polyvinylpyrrolidone (PVP-K30) powder was dissolved in deionized water by ultrasonic vibration for 1 h to form a PVP solution, where the PVP and the deionized water had a mass ratio of 15:1; under continuous stirring, the metal precursor mixed solution was added dropwise to the PVP solution, such that the PVP and the (Pd+Pt) metal elements had a total mass ratio of 20:1, followed by conducting ultrasonic vibration for 1 h; deionized water was added to an obtained mixed solution, and stirred with ultrasonic vibration for 1 h to obtain a $Pd^{2+}$-$Pt^{2+}$-PVP dilution, where the deionized water and the mixed solution had a volume ratio of 20:1;

2) a double reducing agent included a strong reducing agent (oxalic acid)+a weak reducing agent (tartaric acid) (the strong reducing agent and the weak reducing agent had a molar weight ratio of 0.001:1); the strong reducing agent and the weak reducing agent were added to the $Pd^{2+}$-$Pt^{2+}$-PVP dilution in sequence according to the bimetallic element and the reducing agent at a molar weight ratio of 10:1, and stirred and mixed evenly; an obtained mixed solution was condensed and refluxed at 100° C. for 3 h, and cooled to room temperature (25° C.) to obtain a Pd—Pt bimetallic nanoparticle suspension; and 3) as shown in FIG. 2, a carrier $MgO—Al_2O_3$ was added to the Pd—Pt bimetallic nanoparticle suspension and stirred continuously for 12 h; an obtained suspension was centrifuged (at 12,000 rpm), washed, and dried at 100° C. for 12 h successively; an obtained powder sample was heated to 550° C. for 3 h in an oxygen atmosphere for oxidization to obtain a $Pd—Pt/MgO—Al_2O_3$ catalyst.

EXAMPLE 3

As shown in FIG. 1: in this example, the $MgO—Al_2O_3$ prepared in Example 2 was used as a carrier; a bimetallic nanocatalyst was prepared by a supporting method, and a total content of a bimetal (Pd and Pt) accounted for 1.5 wt % of a total mass of the catalyst; bimetallic nanoparticles were prepared by a double-reduction method, including the following steps:

1) according to a prefabricated catalyst amount and a content of the bimetallic active component (1.5 wt %), a $Pd(NO_3)_2$ solution (with a Pd content of 15 wt %) and a $Pt(NO_3)_2$ solution (with a Pt content of 18 wt %)) were diluted with 2 mL of deionized water, and ultrasonically mixed for 0.5 h to obtain a Pd metal precursor aqueous solution and a Pt metal precursor aqueous solution, respectively; polyvinylpyrrolidone (PVP-K30) was weighed and dissolved in the deionized water by ultrasonic vibration, and stirred continuously for 1 h to obtain a PVP solution, where the PVP and the deionized water had a mass ratio of 15:1; according to a mass ratio of the PVP and the Pd metal element at 20:1, and a mass ratio of the PVP and the Pt metal element at 20:1, the Pd metal precursor aqueous solution and the Pt metal precursor aqueous solution were added dropwise to the PVP solution separately, and subjected to ultrasonic vibration for 1 h; the deionized water was added to obtained $Pd^{2+}$-PVP mixed solution and $Pt^{2+}$-PVP mixed solution separately, and stirred with ultrasonic vibration for 1 h to obtain a $Pd^{2+}$-PVP dilution and a $Pt^{2+}$-PVP dilution, respectively; where the deionized water and the $Pd^{2+}$-PVP mixed solution had a volume ratio of 15:1, and the deionized water and the $Pt^{2+}$-PVP mixed solution had a volume ratio of 15:1;

2) a double reducing agent included a strong reducing agent (oxalic acid)+a weak reducing agent (tartaric acid)

(the strong reducing agent and the weak reducing agent had a molar weight ratio of 0.001:1); the strong reducing agent and the weak reducing agent were added to the $Pd^{2+}$-PVP dilution in sequence according to the monometallic element and the reducing agent at a molar weight ratio of 10:1, and stirred and mixed evenly; an obtained mixed solution was condensed and refluxed at 100° C. for 3 h, cooled to room temperature (25° C.), centrifuged (at 15,000 rpm), and washed 3 times; the deionized water was added to Pd nanoparticles, diluted 100 times, and subjected to ultrasonic vibration to form a Pd nanoparticle suspension; and 3) the $Pt^{2+}$-PVP solution was added to the Pd nanoparticle suspension (Pd and Pt had a mass ratio of 4:1), and a double reducing agent was added to a resulting mixed solution according to step 2); an obtained product was stirred, condensed and refluxed at 100° C. for 3 h, cooled to room temperature (25° C.), centrifuged (at 15,000 rpm), and washed to obtain a Pd—Pt bimetallic nanoparticle suspension; and 4) as shown in FIG. 2, a carrier MgO-modified $Al_2O_3$ was added to the Pd—Pt bimetallic nanoparticle suspension and stirred continuously for 12 h; an obtained suspension was centrifuged (at 12,000 rpm), washed, and dried at 100° C. for 12 h successively; an obtained powder sample was heated to 550° C. for 3 h in an oxygen atmosphere for oxidization to obtain a Pd—Pt/MgO—$Al_2O_3$ catalyst.

EXAMPLE 4

As shown in FIG. 1: in this example, the MgO—$Al_2O_3$ prepared in Example 2 was used as a carrier; a bimetallic nanocatalyst was prepared by a supporting method, and a total content of a bimetal (Pd and Pt) accounted for 1.5 wt % of a total mass of the catalyst; bimetallic nanoparticles were prepared by a double-reduction method, including the following steps:

1) according to a prefabricated catalyst amount and a content of the bimetallic active component (1.5 wt %), a $Pd(NO_3)_2$ solution (with a Pd content of 15 wt %) and a $Pt(NO_3)_2$ solution (with a Pt content of 18 wt %)) were diluted with 2 mL of deionized water, and ultrasonically mixed for 0.5 h to obtain a Pd metal precursor aqueous solution and a Pt metal precursor aqueous solution, respectively; polyvinylpyrrolidone (PVP-K30) was weighed and dissolved in the deionized water by ultrasonic vibration, and stirred continuously for 1 h to obtain a PVP solution, where the PVP and the deionized water had a mass ratio of 15:1; according to a mass ratio of the PVP and any monometallic element at 20:1, the Pd metal precursor aqueous solution and the Pt metal precursor aqueous solution were added dropwise to the PVP solution separately, and subjected to ultrasonic vibration for 1 h; the deionized water was added to obtained $Pd^{2+}$-PVP mixed solution and $Pt^{2+}$-PVP mixed solution separately, and stirred with ultrasonic vibration for 1 h to obtain a $Pd^{2+}$-PVP dilution and a $Pt^{2+}$-PVP dilution, respectively; where the deionized water and the $Pd^{2+}$-PVP mixed solution had a volume ratio of 15:1, and the deionized water and the $Pt^{2+}$-PVP mixed solution had a volume ratio of 15:1;

2) a double reducing agent included a strong reducing agent (oxalic acid)+a weak reducing agent (tartaric acid) (the strong reducing agent and the weak reducing agent had a molar weight ratio of 0.001:1); the strong reducing agent and the weak reducing agent were added to the $Pt^{2+}$-PVP dilution in sequence according to the monometallic element and the reducing agent at a molar weight ratio of 10:1, and stirred and mixed evenly; an obtained mixed solution was condensed and refluxed at 100° C. for 3 h, and cooled to room temperature (25° C.) to obtain a Pt nanoparticle suspension; and 3) as shown in FIG. 2, a carrier MgO—$Al_2O_3$ was added to the Pt nanoparticle suspension and stirred continuously for 12 h; an obtained suspension was centrifuged (at 12,000 rpm), washed 3 times, and dried at 100° C. for 12 h to obtain a composite; and 4) the composite obtained in step 3) was added into deionized water, diluted 100 times, and stirred for 3 h to form a suspension; the $Pd^{2+}$-PVP solution was added to the suspension, mixed evenly by ultrasonic vibration for 1 h, and added with a double reducing agent according to step 2) and stirred well; an obtained mixed solution was condensed and refluxed at 100° C. for 3 h, and cooled to room temperature (25° C.); an obtained material was centrifuged (at 12,000 rpm), washed, and dried at 100° C. for 12 h successively; an obtained powder sample was heated to 550° C. for 3 h in an oxygen atmosphere for oxidization to obtain a Pd—Pt/MgO—$Al_2O_3$ catalyst.

EXAMPLE 5

This example differed from Example 1 in that: a combination of the double reducing agent was sodium borohydride+ethanol, and the sodium borohydride and the ethanol had a molar ratio of 0.001:1; other steps were the same as those in Example 1.

EXAMPLE 6

This example differed from Example 1 in that: a combination of the double reducing agent was sodium borohydride+ethylene glycol, and the sodium borohydride and the ethylene glycol had a molar ratio of 0.001:1; other steps were the same as those in Example 1.

EXAMPLE 7

This example differed from Example 1 in that: a combination of the double reducing agent was sodium borohydride+ascorbic acid, and the sodium borohydride and the ascorbic acid had a molar ratio of 0.001:1; other steps were the same as those in Example 1.

Performance Testing

1) A TEM test was conducted on the single Pd metal catalysts prepared in Example 1 and Examples 5 to 7, and results were shown in FIG. 3A to FIG. 3D. In the figure, a was a TEM image of the Pd/La—$Al_2O_3$-supported catalyst prepared by the combination of sodium borohydride+ethanol in Example 5; b was a TEM image of the Pd/La—$Al_2O_3$-supported catalyst prepared by the combination of sodium borohydride+ethylene glycol in Example 6; c was a TEM image of the Pd/La—$Al_2O_3$-supported catalyst prepared by the combination of sodium borohydride+tartaric acid in Example 1; and d was a TEM image of the Pd/La—$Al_2O_3$-supported catalyst prepared by the combination of sodium borohydride+ascorbic acid in Example 7. It was seen from FIG. 3A to FIG. 3D that different reducing agent combinations could obtain single Pd metal-supported catalysts with different nanometer sizes due to different reduction intensities.

2) The TEM test was conducted on the monometallic or bimetallic catalysts prepared in Examples 1 to 4, and results were shown in FIG. 4A to FIG. 4D. In the figure, in a horizontal direction, the second, third and fourth figures were HAADF-STEM results of the Pd—Pt/MgO—$Al_2O_3$ catalyst prepared in Example 2, HRTEM results of the Pd—Pt/MgO—Al₂O₃ catalyst prepared in Example 3, and HRTEM results of the Pd—Pt/MgO—Al₂O₃ catalyst prepared in Example 4. It was seen from FIG. 4A to FIG. 4D that the Pd—Pt bimetallic nanoparticles prepared in Example 2 were in a state of mixing and inter-embedding; the Pd—Pt bimetallic nanoparticles prepared in Example 3 were in a state in which PdO and Pt were in contact with each other but not wrapped; and the Pd—Pt bimetallic nanoparticles prepared in Example 4 were in a state in which PdO and Pt were in contact with each other and wrapped. Therefore, the bimetallic nanocatalyst materials with different atomic structures are obtained by the double-reduction method with different addition sequences and ratios of the double reducing agents, thereby obtaining desired bimetallic nanoparticle-supported nanocatalyst under better control. This provides a technical support for the preparation of monometallic/bimetallic nanoparticle-supported nanocatalysts required for various catalytic reactions.

The above descriptions are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

What is claimed is:

1. A preparation method of a monometallic or bimetallic nanoparticle-supported catalyst, comprising the following steps:
    mixing a capping agent solution, a metal precursor solution, and a double reducing agent for a reduction to obtain a metal nanoparticle suspension; wherein the metal precursor solution comprises one or two metal elements selected from the group consisting of platinum, palladium, rhodium, iridium, cobalt, iron, titanium, vanadium, zinc, gold, silver, and a rare-earth element; mixing the metal nanoparticle suspension with a carrier by a supporting method, or subjecting the metal nanoparticle suspension to centrifugation and washing sequentially by a double-solvent method, and dispersing in water; mixing the obtained suspension with a carrier suspension dispersed in n-hexane to conduct supporting; and roasting the obtained product to obtain the monometallic or bimetallic nanoparticle-supported catalyst; alternatively,
    when the supported catalyst is a bimetallic nanoparticle-supported catalyst, mixing a monometallic precursor solution, the capping agent solution, and the double reducing agent for a first reduction; mixing the obtained monometallic nanoparticle suspension with another metal precursor solution, the capping agent solution, and the double reducing agent for a second reduction to obtain a bimetallic nanoparticle suspension; mixing the bimetallic nanoparticle suspension with the carrier by the supporting method, or subjecting the bimetallic nanoparticle suspension to centrifugation and washing sequentially by the double-solvent method, and dispersing in water; mixing the obtained suspension with the carrier suspension dispersed in n-hexane to conduct supporting; and roasting the resulting product to obtain the bimetallic nanoparticle-supported catalyst; alternatively,
    when the supported catalyst is a bimetallic nanoparticle-supported catalyst, mixing the monometallic precursor solution, the capping agent solution, and the double reducing agent for a first reduction; mixing the obtained monometallic nanoparticle suspension with the carrier; mixing the obtained composite suspension with the another metal precursor solution, the capping agent solution, and the double reducing agent for a second reduction; and subjecting the acquired product to calcination to obtain the bimetallic nanoparticle-supported catalyst; wherein
    a metal element in the monometallic precursor solution is selected from the group consisting of platinum, palladium, rhodium, iridium, cobalt, iron, titanium, vanadium, zinc, gold, silver, and a rare-earth element; a metal element in the another metal precursor solution is selected from the group consisting of platinum, palladium, rhodium, iridium, cobalt, iron, titanium, vanadium, zinc, gold, silver, and a rare-earth element; and the metal element in the monometallic precursor solution is different from the metal element in the another metal precursor solution; and
    the double reducing agent comprises a strong reducing agent and a weak reducing agent;
    the strong reducing agent is selected from the group consisting of sodium borohydride, oxalic acid, and hydrogen; and the weak reducing agent is one or more selected from the group consisting of ethanol, formaldehyde, ethylene glycol, glucose, and tartaric acid; and
    the reduction, the first reduction, and the second reduction each are conducted at 100° C. for 3 h to 12 h.

2. The preparation method according to claim 1, wherein a capping agent in the capping agent solution is selected from the group consisting of polyvinylpyrrolidone, cetyltrimethylammonium bromide, and an oleylamine-dibenzyl ether mixture; and in the oleylamine-dibenzyl ether mixture, oleylamine and dibenzyl ether have a volume ratio of (1-5):1.

3. The preparation method according to claim 2, wherein the capping agent and the metal element in the metal precursor solution have a mass ratio of (5-80):1.

4. The preparation method according to claim 1, wherein the capping agent and the metal element in the metal precursor solution have a mass ratio of (5-80):1.

5. The preparation method according to claim 1, wherein the strong reducing agent and the weak reducing agent have a molar ratio of (0.001-0.1):1.

6. The preparation method according to claim 5, wherein the double reducing agent and the metal element in the metal precursor solution have a molar ratio of (1-10):1.

7. The preparation method according to claim 1, wherein the double reducing agent and the metal element in the metal precursor solution have a molar ratio of (1-10):1.

8. The preparation method according to claim 1, wherein a total mass of the metal element in the metal precursor solution accounts for 0.5% to 2.0% of that of the supported catalyst.

9. The preparation method according to claim 1, wherein the carrier is selected from the group consisting of γ—Al₂O₃, rare-earth element-modified Al₂O₃, and alkaline-earth element-modified Al₂O₃.

10. The preparation method according to claim 1, wherein the roasting is conducted at 350° C. to 550° C. for 3 h to 12 h.

11. The preparation method according to claim 1, wherein the roasting is conducted in an oxygen atmosphere or a nitrogen atmosphere.

* * * * *